April 19, 1932.　　　F. H. RAGAN　　　1,854,667
CLOSURE MEANS FOR UNIVERSAL JOINTS
Filed May 14, 1930
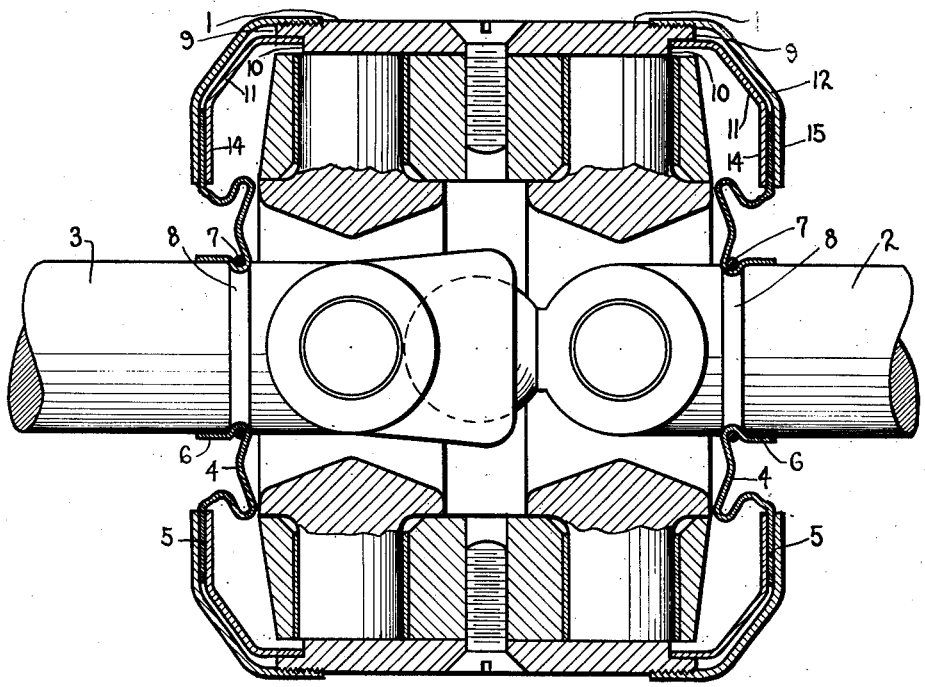
Fig. 1
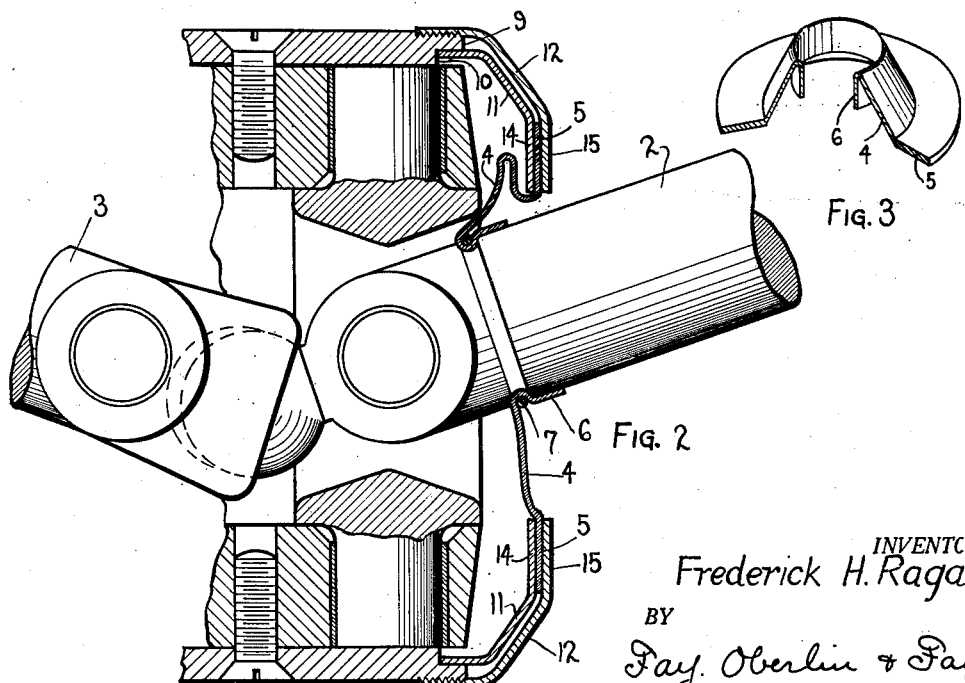
Fig. 2
Fig. 3
INVENTOR.
Frederick H. Ragan
BY
Fay, Oberlin & Fay
ATTORNEYS.

Patented Apr. 19, 1932

1,854,667

UNITED STATES PATENT OFFICE

FREDERICK H. RAGAN, OF SHAKER HEIGHTS, OHIO, ASSIGNOR TO THE COLUMBIA AXLE COMPANY, OF CLEVELAND, OHIO, A CORPORATION OF OHIO

CLOSURE MEANS FOR UNIVERSAL JOINTS

Application filed May 14, 1930. Serial No. 452,366.

My invention, relating as indicated to closure means for universal joints, has specific reference to flexible means adapted to be secured to the body of the universal coupling and one of the shafts which is connected by such coupling for the purpose of retaining the lubricant within the body of the coupling and exclude all foreign material, such as dirt, therefrom.

In order to function satisfactorily as a closure means, the so-called boot of a universal joint must be capable of constant flexure according to the relative angular displacement of the shaft and be capable of withstanding such flexure for a considerable length of time. Another function of the closure means of a universal joint is to positively retain the lubricant within the body of the coupling and prevent any leakage of such lubricant during the operation of the shafts at relatively high velocities. One of the fundamental weaknesses of closure means construction, as heretofore employed, has been that during the rotation of the shaft to which such closure means is secured, the centrifugal force incidental to such rotation has caused the lubricant on the inside of the closure means to be thrown outwardly against the wall thereof, placing such closure means under stress which resulted in premature failure. With the old types of construction, the centrifugal force incidental to the rotation of the shafts and coupling and associated clossure means, at high velocities, is sufficiently great to distend the boot and, when so distended, such force is sufficient to actually strain the lubricant through the flexible material. A further disadvantage of the old types of construction, in which the lubricant is not automatically thrown away from the rotation thereof, is that when the coupling is at rest, the lubricant will settle to the bottom so that, when rotation is resumed, the coupling rotates out of balance. The specific forms of construction of the boot or closure means which have the above named undesirable characteristics, consist of the common form of substantially cylindrical or conical leather element secured at the enlarged terminal to the body of the universal coupling and secured at other terminal to one of the shafts at a point axially removed outside of the body of the coupling.

Other forms of construction whether of the leather boot type or the spherical metallic closure type, all have the same disadvantage in that the centrifugal force due to the rotation of the shaft at a relatively high speed, forces the lubricant outwardly against the walls of the closure means and, consequently, not only places such closure means under a stress causing premature failure thereof, but also forces such lubricant to an area from which it cannot readily move to the interior of the coupling where it is to be utilized for the purpose of lubricating the several moving parts.

It is among the objects of my invention to provide a closure means for universal joints or couplings which shall have none of the above named undesirable characteristics and which shall be simple in its construction and capable of being connected to the body of the coupling and the shaft in such a manner that a premature failure of such closure element will not result. Other objects of my invention will appear as the description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a sectional view through a specific form of universal coupling construction, showing associated therewith the closure means comprising my invention; Fig. 2 is a fragmentary sectional view of a portion of the mechanism illustrated in Fig. 1, showing the shafts thereof in relative angular displacement; and Fig. 3 is a half sectional perspective view of a flexible element forming a part of the closure means comprising my invention.

Referring more specifically to the drawings and more especially to Fig. 1 and other figures in which like numerals are employed to designate like parts, the universal coupling here shown for purposes of illustration has a substantially cylindrical body member 1 which, along with other mechanism assembled therein, is employed to universally connect shafts 2 and 3. It should be noted in connection with the particular form of body member 1 here shown for purposes of illustration, that the principles of my invention about to be explained are applicable to any form or shape of body, the body 1 herein referred to being considered as a substantially cylindrical member, for purposes of convenience of description.

The flexible member, as most clearly shown in Fig. 3, employed in connection with the construction comprising my invention, consists of a coniform body 4 which has an annular flange 5 on the base thereof preferably extending radially of the axis of the body 4, and a flange 6 on the opposite terminal which is rebent as shown, and extends substantially parallel with the axis of the coniform body. The flexible coniform element is secured to the shaft 2 or 3 by means of a ring 7 which engages the flange 6 and which may depress such flange into a circumferential groove 8 on the shaft for the purpose of insuring against axial movement of the flange 6 with respect to the shaft to which it is secured.

The body 1 of the universal coupling has annular flanges 9 formed on the terminals thereof, which flanges have associated therewith annular shoulders 10. A cylindrical shell 11 is mounted coaxially with the body member 1 and is axially and radially supported by the flange 9 and shoulder 10. The outer periphery of the terminals of the body member 1 are threaded to threadably engage a substantially cylindrical shell 12 which is formed similarly to the shell 11.

In mounting the flexible coniform element on the terminal of the body member 1, the shell 11 is positioned against the annular shoulder 10 and the flange 5 is forced axially into engagement with the inner portion 14 of the shell 11 by means of the shell 12. The shells 11 and 12 are so formed that when the outer shell 12 is threaded onto the body 1, the flange 5 is frictionally secured between the portions 14 and 15, respectively, of the inner and outer shells. If desired, a suitable cement, such as shellac, may be spread on the opposite faces of the flange 5, so that after assembly and drying of such cement, a rigid connection between such flange and the inner and outer shells is insured.

As the shafts 2 and 3 are relatively axially displaced, the coniform body 4, as most clearly shown in Fig. 2 for the extreme position of such annular displacement, permits a free movement of the shaft and provides a perfect closure for the end of the coupling. The circumferential groove 8 in which the flange 6 is secured to the shaft, is formed in a plane which, when the shafts are in the position illustrated in Fig. 1, is toward the interior of the coupling from the plane of the flange 5. During the rotation of the coupling any lubricant which may adhere to the inner surface of the flexible element will be thrown outwardly therefrom, due to the centrifugal force incidental to the rotation of the coupling and in being thrown away from the flexible element will not place such element under any tension, causing a premature failure.

Among the many advantages of the above described form of construction, which are obvious to those familiar with the art, it should be noted that by employing the principles of such construction, any centrifugal action which has a tendency to cause the lubricant to leave the body of the coupling urges such lubricant against the metallic shell which affords a rigid impervious retainer. The centrifugal force which has heretofore been the destructive factor of closure means is utilized to create a condition which is conducive to long life of the flexible coupling. By constructing the closure means in accordance with the principles comprising my invention, a more compact coupling structure results having the obvious advantage among others of decreased overall length without any sacrifice of free relative angular movement of the shafts, and further the hinge action on the flexible element is reduced to a minimum.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In combination with a universal coupling for shafts, a coniform flexible member having a flange on one terminal, inner and outer shells secured to the body of said coupling and supporting said flange, and means securing the other terminal of said member to one of such shafts.

2. In combination with a universal coupling for shafts, of closure means for such coupling, and means for attaching said closure means to a portion of said coupling, said means including members removably secured to the body of said coupling and engaging a portion of said closure means on opposite faces thereof.

3. In combination with a universal coupling for shafts, of closure means for such coupling, and means for attaching said closure means to a portion of said coupling, said means including coaxially arranged means removably secured to the body of said coupling and having flat faces engaging a portion of said closure means on opposite sides thereof.

4. In combination with a universal coupling for shafts, of closure means for such coupling, and means for attaching said closure means to a portion of said coupling, said means including coaxially arranged means engaging opposite faces of a portion of said closure means, one of said coaxially arranged means engaged by a complementary seat on the body of said coupling and another of said means threadably engaging said body of said coupling.

Signed by me this 10th day of May, 1930.

FREDERICK H. RAGAN.